Oct. 23, 1934.　　　H. V. WODTKE　　　1,977,787
THREE-CONDUCTOR CABLE
Filed April 7, 1933
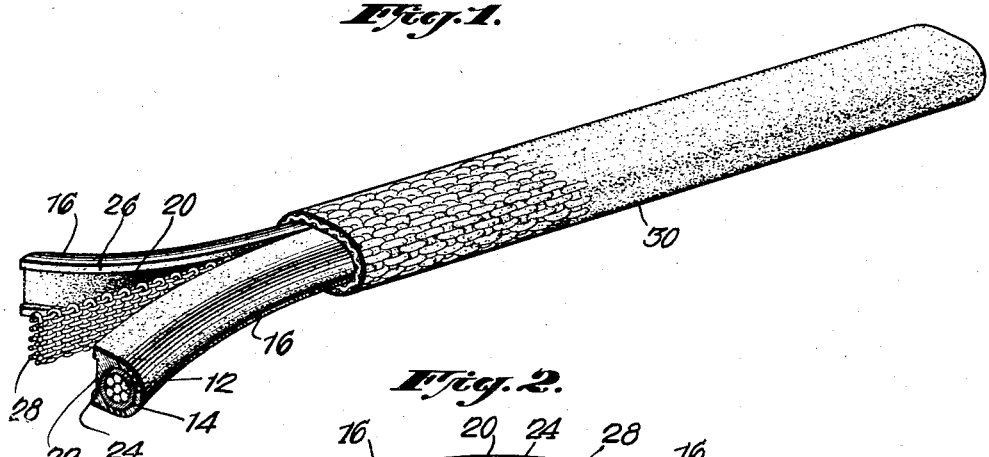
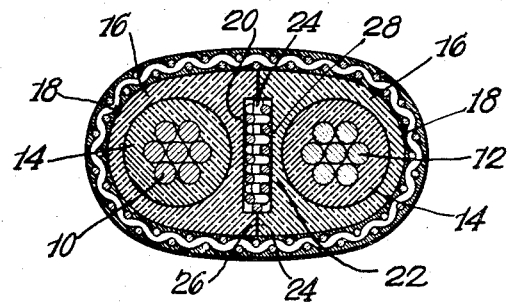
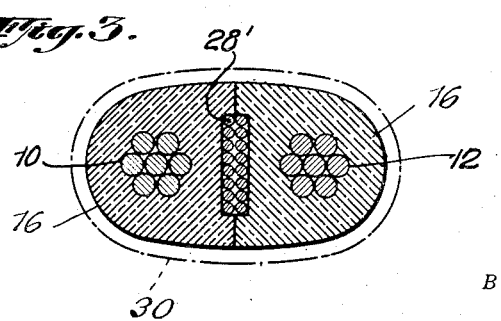
INVENTOR
HANS V. WODTKE.
BY
ATTORNEYS Patented Oct. 23, 1934

1,977,787

UNITED STATES PATENT OFFICE 1,977,787

THREE-CONDUCTOR CABLE

Hans V. Wodtke, Plainfield, N. J., assignor to Anaconda Wire & Cable Company, New York, N. Y., a corporation of Delaware Application April 7, 1933, Serial No. 664,850

3 Claims. (Cl. 173—264)

The present invention relates to insulated moldable conductor cables and particularly to those composed of two conductors having individual insulation such as molded rubber or other plastic material secured thereto and having a bare or neutral conductor interposed between them. Heretofore, three conductor cables have been formed by twisting together three conductors, two having ordinary round insulation and the third being bare. In other known constructions, two insulated conductors have been laid parallel and a bare conductor comprising a large number of fine wires has been wrapped around the two insulated conductors. The bare wire usually forms the neutral wire of a three conductor assembly. It is objectionable to have the bare neutral wire in a position, where it can be exposed to contact with outside metallic coverings, and the fire underwriters object to constructions wherein a bare neutral wire of a three conductor cable is exposed or so located as to be likely to make contact with a metallic conduit or metallic covering.

An object of the present invention is to provide a cable having a pair of spaced insulated conductors and a neutral conductor of bare wire interposed between or enclosed by the insulator bodies of the spaced conductors. The invention will be fully apparent from the following detailed description when read in connection with the accompanying drawing.

In the drawing—

Fig. 1 is a perspective view of a cable having two insulated conductors, with a bare neutral conductor interposed therebetween, parts being shown flared out at one end for the purpose of illustration;

Fig. 2 is an enlarged cross section of the cable shown in Fig. 1;

Fig. 3 is a view similar to Fig. 2 showing an alternative embodiment of the invention.

Referring in detail to the drawing, 10 and 12 are spaced conductors which, as shown, may be formed of stranded wires to give flexibility. Each conductor is surrounded with any suitable layer of circular insulation, such as indicated at 14. Surrounding each of the conductors 10 and 12, there is a respective body of insulation 16 which has an outer curved surface 18 and an inner substantially flat surface formed with a recess adapted to enclose the neutral conductor. The recess, as illustrated generally at 20, is defined by a central wall 22 and outer spaced ridges 24, which abut substantially along the line 26 located midway between the spaced conductors 10 and 12. The two insulator bodies with their overhanging ridges 24 jointly form a longitudinally extending void, which is adapted to accommodate a bare neutral conductor 28.

Conductor 28 may be a standard conductor to give flexibility. Preferably, it is substantially rectangular in cross section. The use of such rectangular neutral conductor permits a saving in the over-all transverse width of the multiple conductor cable as a whole.

A jacket 30 of woven, braided, or other suitable form surrounds the assembly and serves to hold the D-shaped bodies in proper position with the bare conductor enclosed in the void, or recess defined by the ridges 24 and the faces 20—22. The D-shaped insulated bodies with the projections or ridges 24 at the corners contributes to the practicability of the assembly, by holding the bare conductor 28 in place both during the assembly of the cable and after its completion. The outer jacket, 30, may be woven or braided and treated with insulating or weather-proofing substances, in any of the manners well known in the art.

In the embodiment of the invention illustrated in Fig. 3, the conductors 10 and 12 are embedded directly in the material of the insulator bodies 16. That is without the separate insulator coverings, such as shown at 14 in Fig. 2. This view also shows the central member 28' formed of a plurality of parallel strands. These strands may be of material having greater tensile strength than the strands of the conductors 10 and 12, so as to form a supporting wire for the cable. For example, the strands forming the member 28' may be of hard copper or of steel, or alloy metal of high tensile strength. Otherwise, this embodiment of the invention is substantially the same as that shown in Fig. 2.

The jacket 30ª shown in dotted lines in Fig. 3 may be the same as that shown in Fig. 2, or it may be a braided or wrapped covering. Also the central supporting member 28 may take the form of a flat ribbon-like braid like that shown in Fig. 1. Or, it may constitute a substantially flat stranded member formed by flattening out a normally round stranded cable. And whatever its structure it may serve the double function of a return conductor and a relatively high tensile strength cable supporting element.

While I have described quite specifically the particular embodiment of the invention herein illustrated it is to be understood that various modifications may be made by those skilled in the art without departure from the invention as defined in the appended claims.

What I claim is:—

1. A multiple conductor cable comprising two flexible conductor elements, each embedded in a respective flexible body of insulating material having a curved outer face and a grooved inner face, and a relatively high tensile strength flat multiple strand supporting element positioned in the void formed by the grooved faces.

2. A multiple conductor cable comprising spaced conductor elements each surrounded by a solid flexible body of insulating material having a preformed inner recess and a curved outer face, the recesses of said bodies jointly forming a void of rectangular cross section and a multiple strand conductor of substantially rectangular cross section positioned within said void.

3. A multiple conductor cable comprising spaced conductors, respective bodies of flexible preformed solid insulating material about the conductors, each having a curved outer face and an inner face with spacing ridges at the edges thereof, a flat conductor comprised of interwoven strands positioned between said spacing ridges and an outer jacket holding said spacing ridges in abutting relationship.

HANS V. WODTKE.